United States Patent
Yim et al.

(10) Patent No.: US 7,292,635 B2
(45) Date of Patent: Nov. 6, 2007

(54) INTERFRAME WAVELET VIDEO CODING METHOD

(75) Inventors: Chang-hoon Yim, Seoul (KR); Ho-jin Ha, Seoul (KR); Bac-keun Lee, Bucheon-si (KR); Woo-jin Han, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 441 days.

(21) Appl. No.: 10/892,447

(22) Filed: Jul. 16, 2004

(65) Prior Publication Data
US 2005/0013371 A1    Jan. 20, 2005

Related U.S. Application Data

(60) Provisional application No. 60/492,981, filed on Aug. 7, 2003.

(30) Foreign Application Priority Data
Jul. 18, 2003    (KR) ............... 10-2003-0049449

(51) Int. Cl.
*H04B 1/66*    (2006.01)

(52) U.S. Cl. .................. 375/240.16; 375/240.19; 375/240.15; 375/240.14; 375/240.03; 375/240.24; 348/699; 382/249; 382/236; 382/238; 382/248

(58) Field of Classification Search ........... 375/240.16, 375/240.19, 240.15, 240.24, 240.14, 240.26, 375/240.03; 348/699; 382/249, 248, 236, 382/238

See application file for complete search history.

(56) References Cited

U.S. PATENT DOCUMENTS

| | | | |
|---|---|---|---|
| 5,642,166 A | | 6/1997 | Shin et al. |
| 5,841,473 A | * | 11/1998 | Chui et al. ............... 348/390.1 |
| 6,157,746 A | | 12/2000 | Sodagar et al. |
| 6,236,758 B1 | | 5/2001 | Sodagar et al. |
| 6,895,050 B2 | * | 5/2005 | Lee ...................... 375/240.03 |
| 7,042,946 B2 | * | 5/2006 | Turaga et al. .......... 375/240.19 |
| 2004/0114689 A1 | * | 6/2004 | Zhang et al. .......... 375/240.16 |

OTHER PUBLICATIONS

Fully Scalable 3-D Overcomplete Wavelet Video Coding using Adaptive Motion Compensated Temporal Filtering/Jong Chul Ye, et al./Philips Research USA.

* cited by examiner

*Primary Examiner*—Shawn S. An
(74) *Attorney, Agent, or Firm*—Sughrue Mion, PLLC

(57) ABSTRACT

An interframe wavelet video coding (IWVC) method by which an average temporal distance (ATD) is minimized is provided. The IWVC method comprises receiving a group-of-frames and decomposing the group-of-frames into difference frames and first average frames between the frames in a first forward temporal direction and a backward temporal direction, wavelet-decomposing the first difference frames and the first average frames, and quantizing coefficients resulting from the wavelet-decomposition to generate a bitstream. The IWVC method provides improved video coding performance.

13 Claims, 11 Drawing Sheets

INTERFRAME WAVELET VIDEO CODING METHOD

BACKGROUND OF THE INVENTION

This application claims the priorities of Korean Patent Application No. 2003-0049449 filed on Jul. 18, 2003, with the Korean Intellectual Property Office, and U.S. Provisional Application No. 60/492,981 filed on Aug. 7, 2003, with the United States Trademark and Patent Office, the disclosures of which are incorporated herein in its entirety by reference.

1. Field of the Invention

The present invention relates to a wavelet video coding method, and more particularly, to an interframe wavelet video coding (IWVC) method in which an average temporal distance is reduced by changing a temporal filtering direction.

2. Description of the Related Art

With the development of information communication technology including Internet, video communication as well as text and voice communication has increased. Conventional text communication cannot satisfy the various demands of users, and thus multimedia services that can provide various types of information such as text, pictures, and music have increased. Multimedia data requires a large capacity storage medium and a wide bandwidth for transmission since the amount of multimedia data is usually large. For example, a 24-bit true color image having a resolution of 640*480 needs a capacity of 640*480*24 bits, i.e., data of about 7.37 Mbits, per frame. When this image is transmitted at a speed of 30 frames per second, a bandwidth of 221 Mbits/sec is required. When a 90-minute movie based on such an image is stored, a storage space of about 1200 Gbits is required. Accordingly, a compression coding method is a requisite for transmitting multimedia data including text, video, and audio.

A basic principle of data compression is removing data redundancy. Data can be compressed by removing spatial redundancy in which the same color or object is repeated in an image, temporal redundancy in which there is little change between adjacent frames in a moving image or the same sound is repeated in audio, or mental visual redundancy taking into account human eyesight and limited perception of high frequency. Data compression can be classified into lossy/lossless compression according to whether source data is lost, intraframe/interframe compression according to whether individual frames are compressed independently, and symmetric/asymmetric compression according to whether time required for compression is the same as time required for recovery. Data compression is defined as real-time compression when a compression/recovery time delay does not exceed 50 ms and as scalable compression when frames have different resolutions. For text or medical data, lossless compression is usually used. For multimedia data, lossy compression is usually used. Meanwhile, intraframe compression is usually used to remove spatial redundancy, and interframe compression is usually used to remove temporal redundancy.

Difference types of transmission media for multimedia have different performance. Currently used transmission media have various transmission rates. For example, an ultrahigh-speed communication network can transmit data of several tens of megabits per second while a mobile communication network has a transmission rate of 384 kilobits per second. In conventional video coding methods such as Motion Picture Experts Group (MPEG)-1, MPEG-2, H.263, and H.264, temporal redundancy is removed by motion compensation based on motion estimation and compensation, and spatial redundancy is removed by transform coding. These methods have satisfactory compression rates, but they do not have the flexibility of a truly scalable bitstream. Accordingly, to support transmission media having various speeds or to transmit multimedia at a data rate suitable to a transmission environment, data coding methods having scalability, such as wavelet video coding and subband video coding, may be suitable to a multimedia environment. For example, Interframe Wavelet Video Coding (IWVC) can provide a very flexible, scalable bitstream. However, conventional IWVC has lower performance than a coding method such as H.264. Due to this low performance, IWVC is used only for very limited applications although it has very excellent scalability. Accordingly, it has been an issue to improve the performance of data coding methods having scalability.

SUMMARY OF THE INVENTION

The present invention provides a scalable data coding method which provides improved performance by reducing a total temporal distance for motion estimation.

According to an aspect of the present invention, there is provided an interframe wavelet video coding method comprising receiving a group-of-frames and decomposing the group-of-frames into first difference frames and first average frames between the frames in a first forward temporal direction and a first backward temporal direction, wavelet-decomposing the first difference frames and the first average frames, and quantizing coefficients resulting from the wavelet-decomposition to generate a bitstream. Preferably, the interframe wavelet video coding method may further comprise obtaining a motion vector between frames and compensating for a temporal motion using the motion vector before decomposing the group-of-frames into the first difference and average frames. Also, the first forward temporal direction and the first backward temporal direction are preferably combined such that an average of temporal distances between frames in the group-of-frames is minimized.

The decomposing the group-of-frames into the first difference and average frames may comprise (a) decomposing the group-of-frames into a first difference frame and a first average frame between two frames in the first forward temporal direction; and (b) decomposing the group-of-frames into another first difference frame and another first average frame between other two frames in the first backward temporal direction. The steps (a) and (b) may be alternately performed with respect to the frames in the group-of-frames. Meanwhile, the decomposing the group-of-frames into the first difference and average frames may further comprise decomposing the first average frames into a second difference frame and a second average frame between two first average frames in either of a second forward temporal direction and a second backward temporal directions. Here, the decomposing the first average frames into the second difference and average frames may be repeated a plurality number of times. The second forward temporal direction and the second backward temporal direction may be combined such that an average of temporal distances between frames in the group-of-frames is minimized.

The decomposing the first average frames into the second difference and average frames may comprise (c) decomposing the first average frames into a second difference frame and a second average frame between two first average frames in the second forward temporal direction, and (d) decomposing the group-of-frames into another second difference frame and another second average frame between other two first average frames in the second backward temporal direction. The steps (c) and (d) may be alternately performed with respect to the first average frames.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

A preferred embodiment of the present invention will now be described in detail with reference to the accompanying drawings.

Figure 1:
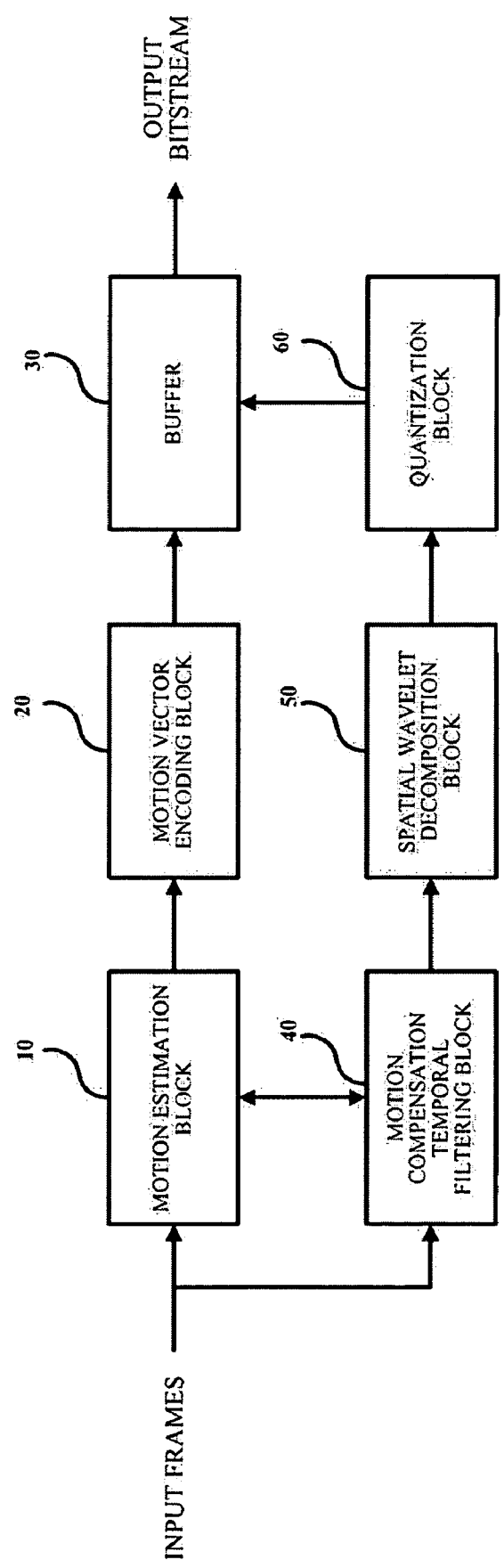
FIG. 1 is a block diagram of an encoder performing an interframe wavelet video coding (IWVC) method.

FIG. 1 is a block diagram of an encoder performing an interframe wavelet video coding (IWVC) method.

The encoder performing an IWVC method includes a motion estimation block 10 which obtains a motion vector, a motion compensation temporal filtering block 40 which removes temporal redundancy using the motion vector, a spatial wavelet decomposition block 50 which removes spatial redundancy, a motion vector encoding block 20 which encodes the motion vector using a predetermined algorithm, a quantization block 60 which quantizes wavelet coefficients of respective components generated by the spatial wavelet decomposition block 50, and a buffer 30 which temporarily stores an encoded bitstream received from the quantization block 60.

The motion estimation block 10 obtains a motion vector used by the motion compensation temporal filtering block 40 using a hierarchical method such as Hierarchical Variable Size Block Matching (HVSBM).

The motion compensation temporal filtering block 40 decomposes frames into low- and high-frequency frames in a temporal direction using the motion vector obtained by the motion estimation unit 10. In more details, an average of two frames is defined as a low-frequency component, and half of a difference between the two frames is defined as a high-frequency component. Frames are decomposed in Group-of-Frames (GOF) units. Through such decomposition, temporal redundancy is removed. Decomposition into high- and low-frequency frames may be performed using only a pair of frames without using a motion vector. However, decomposition using a motion vector shows better performance than that using only a pair of frames. For example, where a portion of a first frame is moved in a second frame, an amount of a motion can be represented by a motion vector. The portion of the first frame is compared with a portion to which a portion of the second frame at the same position as the portion of the first frame is moved by the motion vector, and a temporal motion is compensated. Thereafter, the first and second frames are decomposed into low- and high-frequency frames.

The spatial wavelet decomposition block 50 wavelet-decomposes frames that have been decomposed in the temporal direction by the motion compensation temporal filtering block 40 into spatial low- and high-frequency components, thereby removing spatial redundancy.

The motion vector encoding block 20 encodes a motion vector hierarchically obtained by the motion estimation block 10 such that the motion vector has an optimal number of bits using a rate-distortion algorithm, and then transmits the encoded motion vector to the buffer 30. The quantization block 60 quantizes and encodes wavelet coefficients of components generated by the spatial wavelet decomposition block 50. An encoded bitstream assumes scalability. The buffer 30 stores the encoded bitstream before transmission and is controlled by a rate control algorithm.

Figure 2:
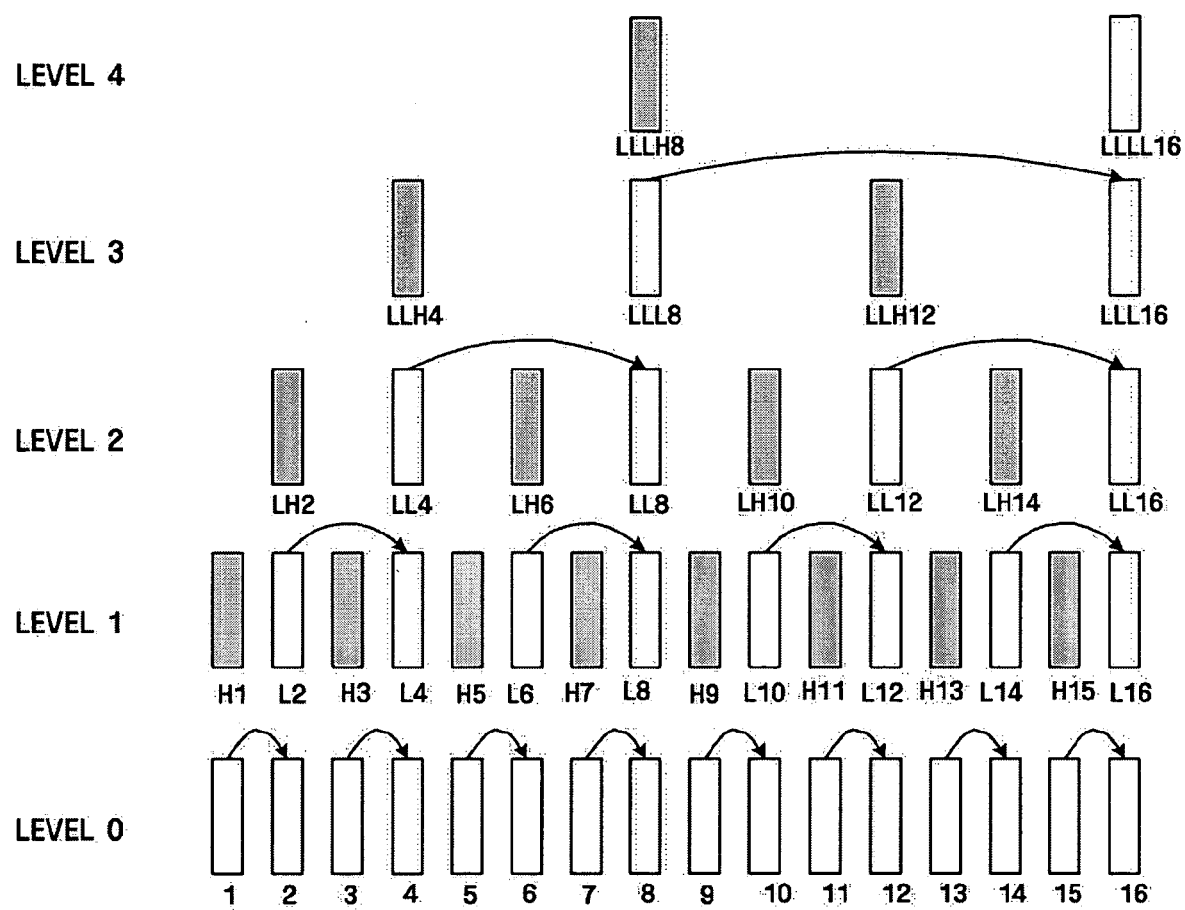
FIG. 2 illustrates directions of motion estimation in a conventional IWVC.

FIG. 2 illustrates directions of motion estimation in conventional IWVC.

In FIG. 2, a single GOF includes 16 frames. Two adjacent frames in a pair are replaced by a high-frequency frame and a low-frequency frame. In the conventional IWVC, motion estimation is performed only in a single direction, i.e., in a forward direction.

For example, at level 0, motion estimation between frames 1 and 2 is performed in a direction from the frame 1 to the frame 2. Thereafter, a temporal high-frequency sub-band frame H1 is positioned at the frame 1, and a temporal low-frequency sub-band frame L2 is positioned at the frame 2. In this case, the temporal low-frequency sub-band L2 at level 1 is similar to the frame 2 at the level 0, and the temporal high-frequency sub-band H1 is similar to an edge image of the frame 1 at the level 0. As such, pairs of frames 1 and 2, 3 and 4, 5 and 6, 7 and 8, 9 and 10, 11 and 12, 13 and 14, and 15 and 16 at the level 0 are replaced by pairs of sub-band frames H1 and L2, H3 and L4, H5 and L6, H7 and L8, H9 and L10, H11 and L12, H13 and L14, and H15 and L16 which form frames at the level 1.

Temporal low-frequency sub-band frames at the level 1 are decomposed into temporal low-frequency sub-band frames and temporal high-frequency sub-band frames at level 2. For example, for temporal decomposition, motion estimation is performed in a direction from the frame L2 to the frame L4. As a result, at the level 2, a temporal high-frequency sub-band frame LH2 is positioned at a position of the frame L2, and a temporal low-frequency sub-band frame LL4 is positioned at a position of the frame L4. Similarly, the frame LH2 is similar to an edge image of the frame L2, and the frame LL4 is similar to the frame L4. As such, frames L2, L4, L6, L8, L11, L12, L14, and L16 at the level 1 are replaced by frames LH2, LL4, LH6, LL8, LH10, LL12, LH14, and LL16 at the level 2.

In the same manner as described above, the temporal low-frequency sub-band frames LL4, LL8, LL12 and LL16 at the level 2 are replaced by temporal high- and low-frequency sub-band frames LLH4, LLL6, LLH12, and LLL16 at level 3. The temporal low-frequency sub-band frames LLL6 and LLL16 at the level 3 are finally replaced by temporal high- and low-frequency sub-band frames LLLH8 and LLLL16 at level 4.

In FIG. 2, shaded squares represent temporal high-frequency sub-band frames, and non-shaded squares represent temporal low-frequency sub-band frames. Consequently, the frames 1 through 16 at the level 0 are decomposed into five types of temporal sub-bands through temporal filtering from the level 0 to the level 4. This decomposition results in:

one LLLL frame LLLL16;
one LLLH frame: LLLH8;
two LLH frames LLH4 and LLH12;
four LH frames LH2, LH6, LH10, and LH14; and
eight H frames H1, H3, H5, H7, H9, H11, H13, and H15.

Where a single GOF includes eight frames, the eight frames are finally decomposed into four types of temporal sub-bands through temporal filtering from level 0 to level 3. Where a single GOF includes 32 frames, the 32 frames are finally decomposed into six types of temporal sub-bands through temporal filtering from level 0 to level 5.

The present invention provides a scalable data coding method in which performance is improved by reducing a total temporal distance for motion estimation. To quantitatively calculate the total temporal distance, an average temporal distance (ATD) is defined. To calculate the ATD, a temporal distance is calculated first. The temporal distance is defined as a positional difference between two frames. For example, a temporal distance between the frame 1 and the frame 2 is defined as 1, and a temporal distance between the frame L2 and the frame L4 is defined as 2. The ATD is obtained by dividing the sum of temporal distances between frames in pairs, which are subjected to an operation for motion estimation, by the number of the pairs of the frames.

Referring to FIG. 2, a temporal distance for motion estimation increases as the level increases. Where motion estimation is performed between the frames 1 and 2 at the level 1, a temporal distance is calculated as 2−1=1. Similarly, a temporal distance for motion estimation at the level 1 is 2, and a temporal distance for motion estimation at the level 3 is 8. In FIG. 2, 8, 4, 2, and 1 pairs of frames for motion estimation exist at the levels 0, 1, 2, and 3, respectively. Accordingly, the total number of pairs of frames used for motion estimation is 15. This is arranged in Table 1.

TABLE 1

Number of pairs of frames and temporal distance for motion estimation at each level in conventional IWVC

| | Number of pairs of frames for motion estimation | Temporal distance for motion estimation |
| --- | --- | --- |
| Level 0 | 8 | 1 |
| Level 1 | 4 | 2 |
| Level 2 | 2 | 4 |
| Level 3 | 1 | 8 |

As the temporal distance increases, a size of a motion vector also increases. In particular, this phenomenon rapidly appears in a video sequence having fast motions. In the conventional IWVC shown in FIG. 2, as the level increases, the temporal distance also increases. A large temporal distance at a high level may cause coding efficiency of the conventional IWVC to decrease. The ATD is calculated in the conventional IWVC as follows:

$$ATD = \frac{8 \times 1 + 4 \times 2 + 2 \times 4 + 1 \times 8}{15} = 2.13$$

Figure 3A:
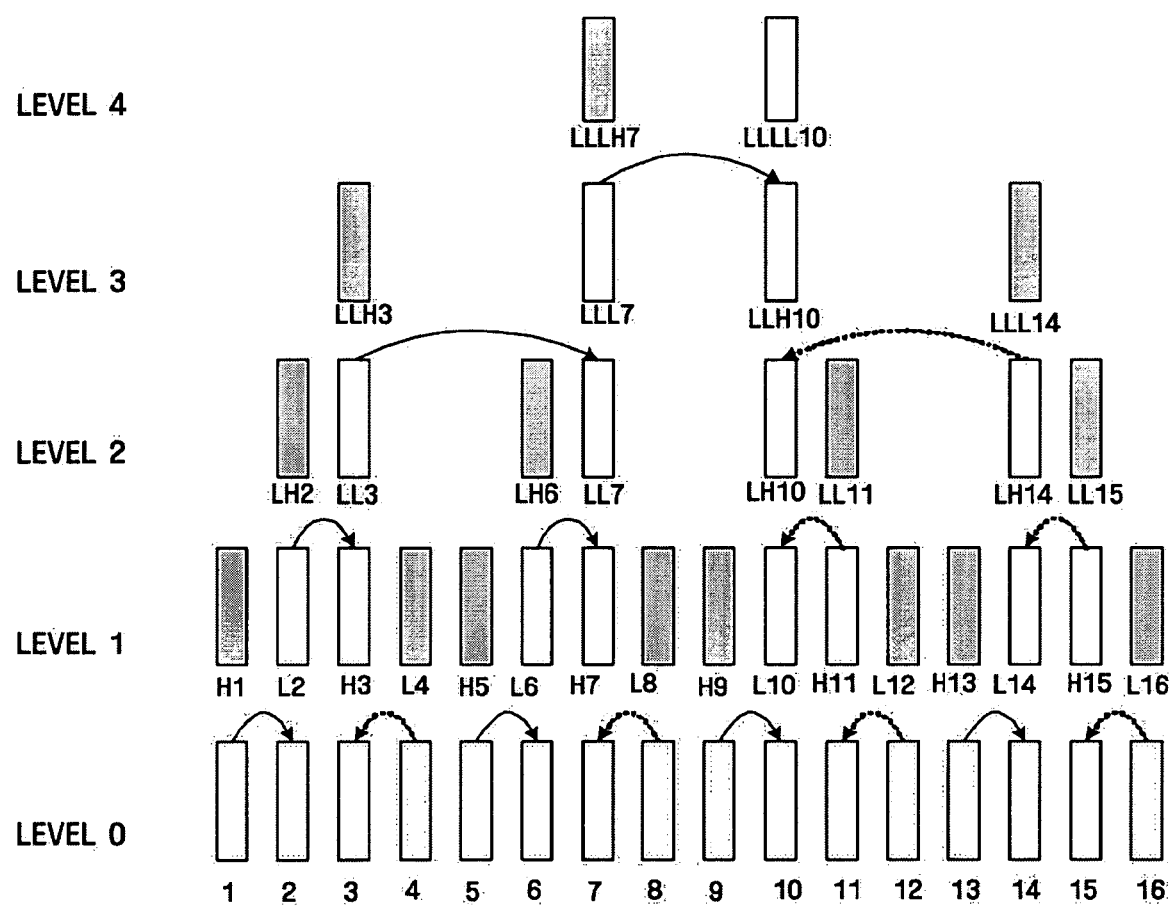
FIGS. 3A and 3B illustrate directions of motion estimation in IWVC according to a first embodiment of the present invention.
Figure 3B:
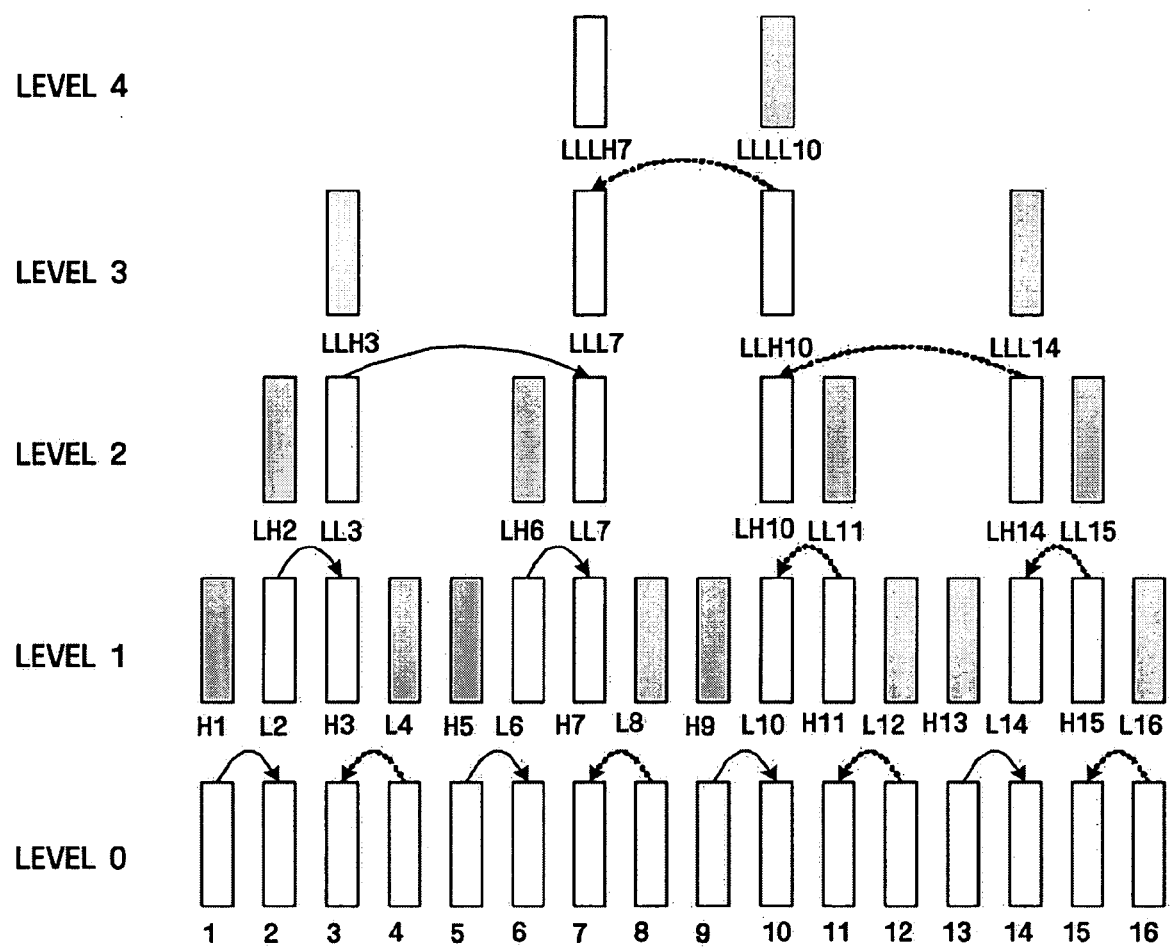
Figure 4A:
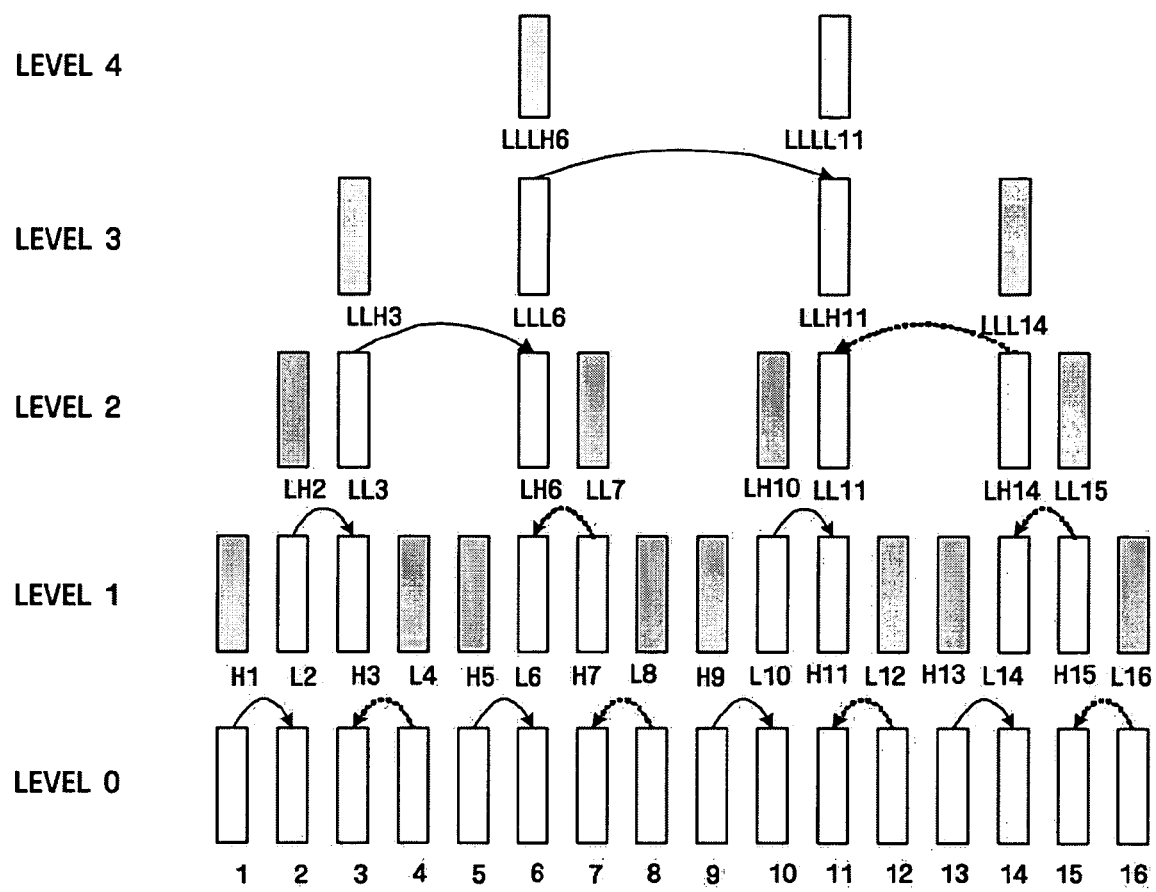
FIGS. 4A and 4B illustrate directions of motion estimation in IWVC according to a second embodiment of the present invention.
Figure 4B:
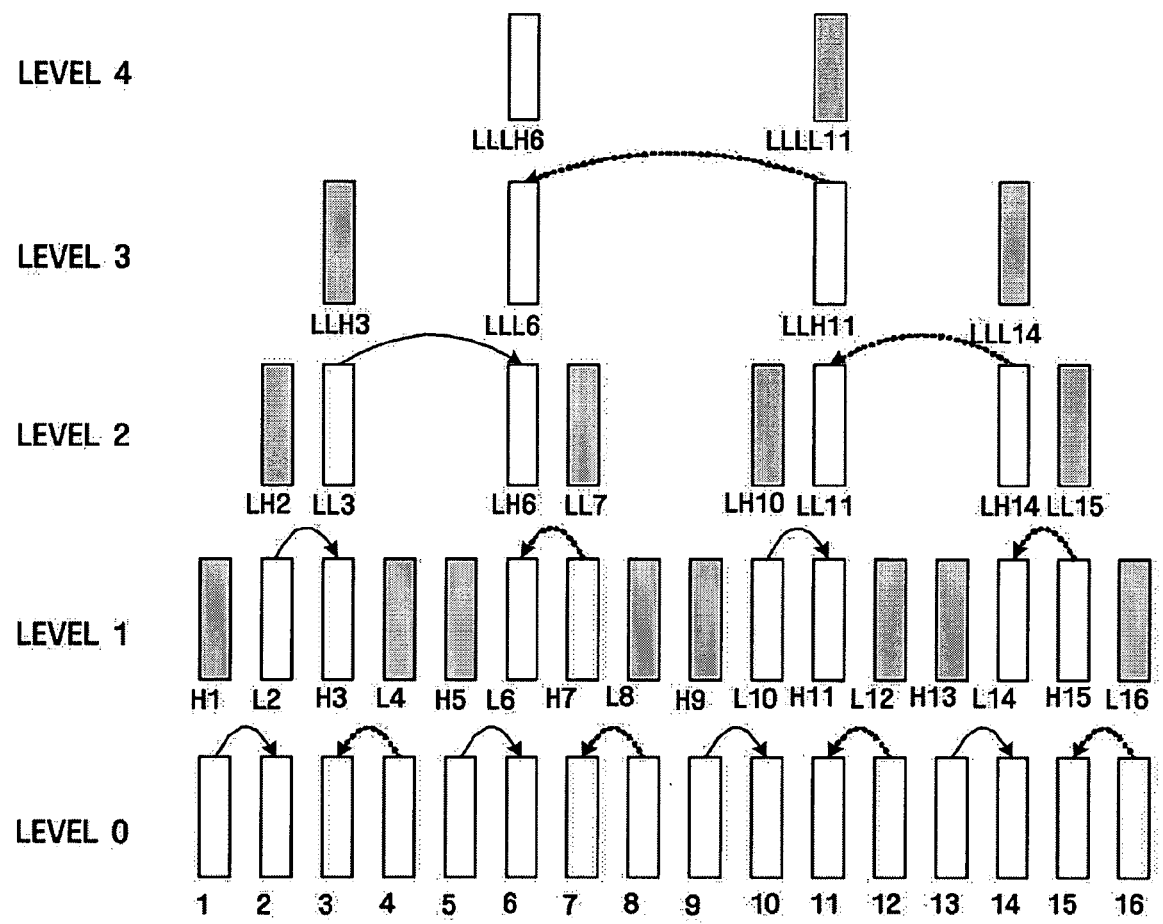
Figure 5:
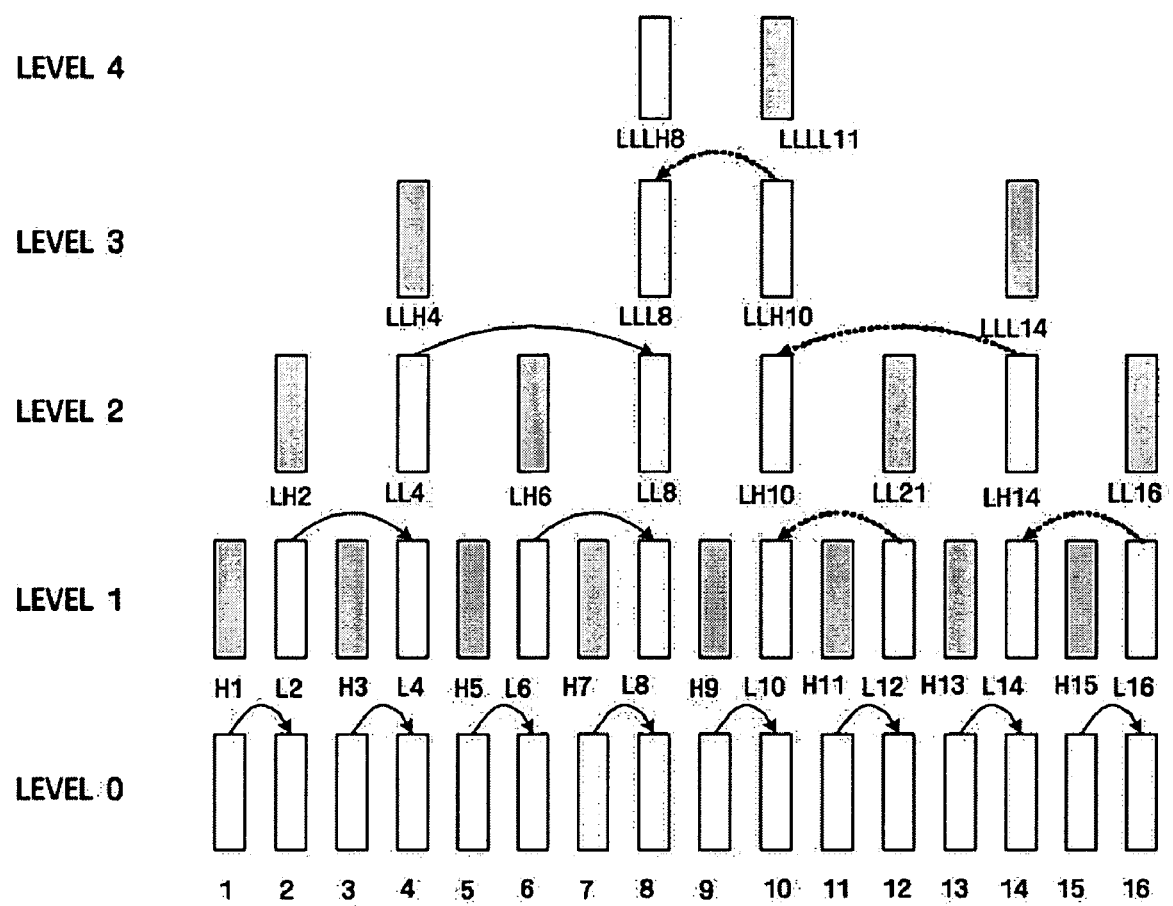
FIG. 5 illustrates directions of motion estimation in IWVC according to a third embodiment of the present invention.
Figure 6:
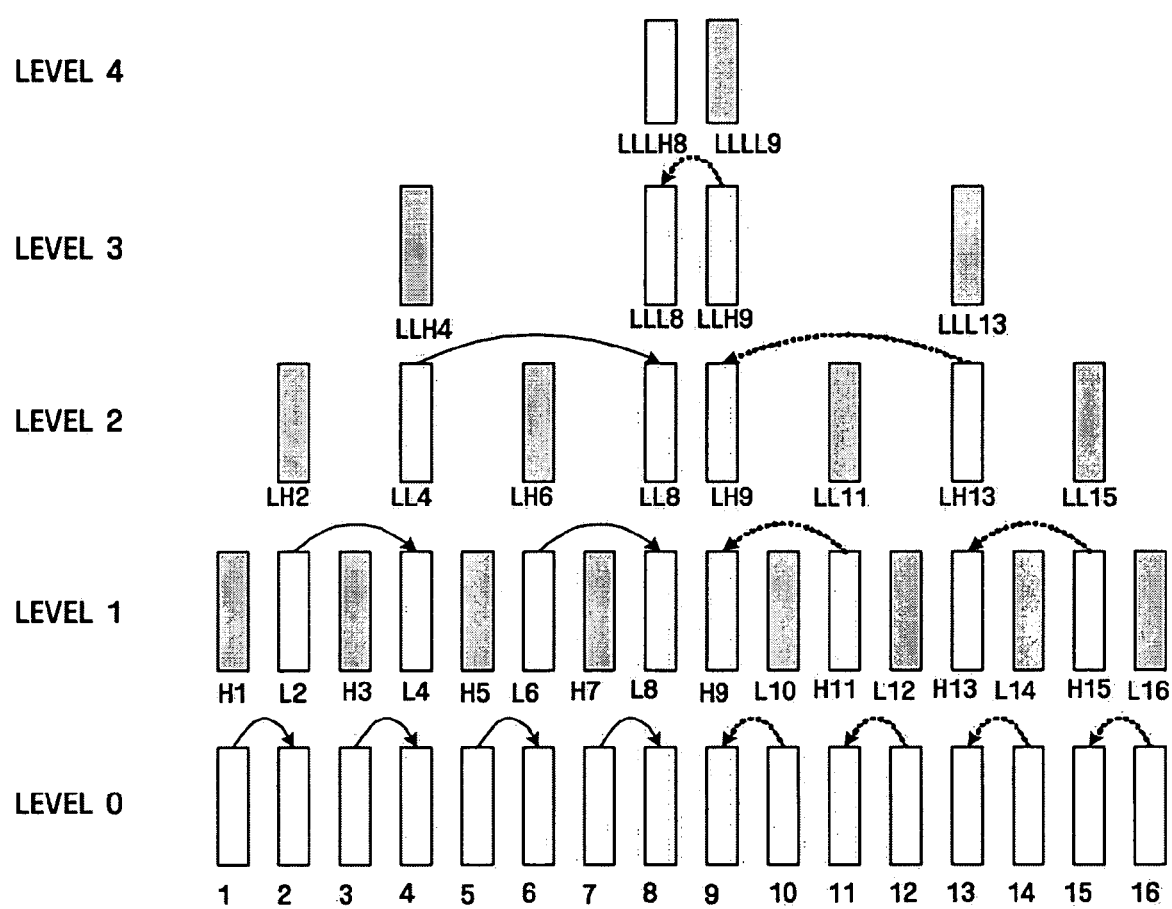
FIG. 6 illustrates directions of motion estimation in IWVC according to a fourth embodiment of the present invention.

FIGS. 3A through 6 illustrate different directions of motion estimation in IWVC according to different embodiments of the present invention. Hereinafter, an IWVC method having directions of motion estimation shown in FIGS. 3A and 3B is referred to as Method1. An IWVC method having directions of motion estimation shown in FIGS. 4A and 4B is referred to as Method2. An IWVC method having directions of motion estimation shown in FIG. 5 is referred to as Method3, and an IWVC method having directions of motion estimation shown in FIG. 6 is referred to as Method4. Since Method1 and Method2 provide a minimum ATD, they will be described in more detail by dividing each method into two modes according to whether a direction of motion estimation at the level 3 is a forward direction or a backward direction. In other words, Method1 is divided into Method1-a and Method1-b, and Method2 is divided into Method2-a and Method2-b. In FIGS. 3A through 6, solid lines denote forward motion estimation, and dotted lines denote backward motion estimation.

Referring to FIGS. 3A and 3B, in Method1, both of the forward motion estimation and the backward motion estimation are present in level 0. Motion estimation between frames 1 and 2 is performed in a forward direction from the frame 1 to the frame 2. A temporal high-frequency sub-band frame H1 is positioned at the frame 1, and a temporal low-frequency sub-band frame L2 is positioned at the frame 2. However, motion estimation on subsequent two frames is different. Motion estimation between frames 3 and 4 is performed in a backward direction from the frame 4 to the frame 3. A temporal high-frequency sub-band frame H4 is positioned at the frame 4, and a temporal low-frequency sub-band frame L3 is positioned at the frame 3.

At the level 1, motion estimation is performed between the frames L2 and L3. As such, while a temporal distance for motion estimation at the level 1 is 2 in the conventional IWVC method, a temporal distance for motion estimation at the level 1 is 1 in Method1 shown in FIGS. 3A and 3B. In other words, when motion estimation is performed in both of the forward and backward directions at the level 0, a temporal distance for the motion estimation can be reduced to 1 at the level 1. All of the directions of motion estimation except for directions at level 3 are the same between Method1-a and Method1-b. As shown in FIGS. 3A and 3B, LLLL frames are positioned at positions of frames 10 and 7 in respective Method1-a and Method1-b.

Directions of motion estimation at the level 0 are the same between Method 1 and Method2, but directions of motion estimation at the level 1 are different between Method1 and Method2. In Method1, forward motion estimation is performed between frames L6 and L7 and backward motion estimation is performed between frames L10 and L11. Conversely, in Method2, backward motion estimation is performed between the frames L6 and L7, and forward motion estimation is performed between the frames L10 and L11. All of the directions of motion estimation except for directions at level 3 are the same between Method2-a and Method2-b. As shown in FIGS. 4A and 4B, LLLL frames are positioned at positions of frames 11 and 6 in respective Method2-a and Method2-b.

The numbers of pairs of frames used for motion estimation and temporal distances in Method1 and Method2 are shown in Tables 2 and 3.

TABLE 2

Number of pairs of frames and temporal distance for motion estimation at each level in Method1

| | Number of pairs of frames for motion estimation | Temporal distance for motion estimation |
|---|---|---|
| Level 0 | 8 | 1 |
| Level 1 | 4 | 1 |
| Level 2 | 2 | 4 |
| Level 3 | 1 | 3 |

TABLE 3

Number of pairs of frames and temporal distance for motion estimation at each level in Method2

| | Number of pairs of frames for motion estimation | Temporal distance for motion estimation |
|---|---|---|
| Level 0 | 8 | 1 |
| Level 1 | 4 | 1 |
| Level 2 | 2 | 3 |
| Level 3 | 1 | 5 |

The ATD is calculated in Method1 as follows:

$$ATD = \frac{8 \times 1 + 4 \times 1 + 2 \times 4 + 1 \times 3}{15} = 1.53.$$

The ATD is calculated in Method2 as follows:

$$ATD = \frac{8 \times 1 + 4 \times 1 + 2 \times 3 + 1 \times 5}{15} = 1.53.$$

In Method3 and Method4 shown in FIGS. 5 and 6, the LLLL frame is positioned at a position of a central frame, i.e., frame 8. As compared to Method1 and Method2, Method3 and Method4 provide a larger ATD and are arranged in Tables 4 and 5.

TABLE 4

Number of pairs of frames and temporal distance for motion estimation at each level in Method3

| | Number of pairs of frames for motion estimation | Temporal distance for motion estimation |
|---|---|---|
| Level 0 | 8 | 1 |
| Level 1 | 4 | 2 |
| Level 2 | 2 | 4 |
| Level 3 | 1 | 2 |

TABLE 5

Number of pairs of frames and temporal distance for motion estimation at each level in Method4

| | Number of pairs of frames for motion estimation | Temporal distance for motion estimation |
|---|---|---|
| Level 0 | 8 | 1 |
| Level 1 | 4 | 2 |
| Level 2 | 2 | 4 |
| Level 3 | 1 | 1 |

The ATD is calculated in Method3 as follows:

$$ATD = \frac{8 \times 1 + 4 \times 2 + 2 \times 4 + 1 \times 2}{15} = 1.73.$$

The ATD is calculated in Method4 as follows:

$$ATD = \frac{8 \times 1 + 4 \times 1 + 2 \times 4 + 1 \times 1}{15} = 1.67.$$

The ATDs obtained in Method1 through Method4 are 1.53, 1.53, 1.73, and 1.67, respectively; while the ATD obtained in the conventional IWVC is 2.13. Among Method1 through Method4 shown in FIGS. 3A through 6, Method1 and Method2 provide a least ATD.

The ATD corresponds to a total temporal distance for motion estimation. When a total temporal distance for motion estimation decreases, a total motion vector also decreases. Such characteristic gives higher coding efficiency than the conventional IWVC.

Figure 7:
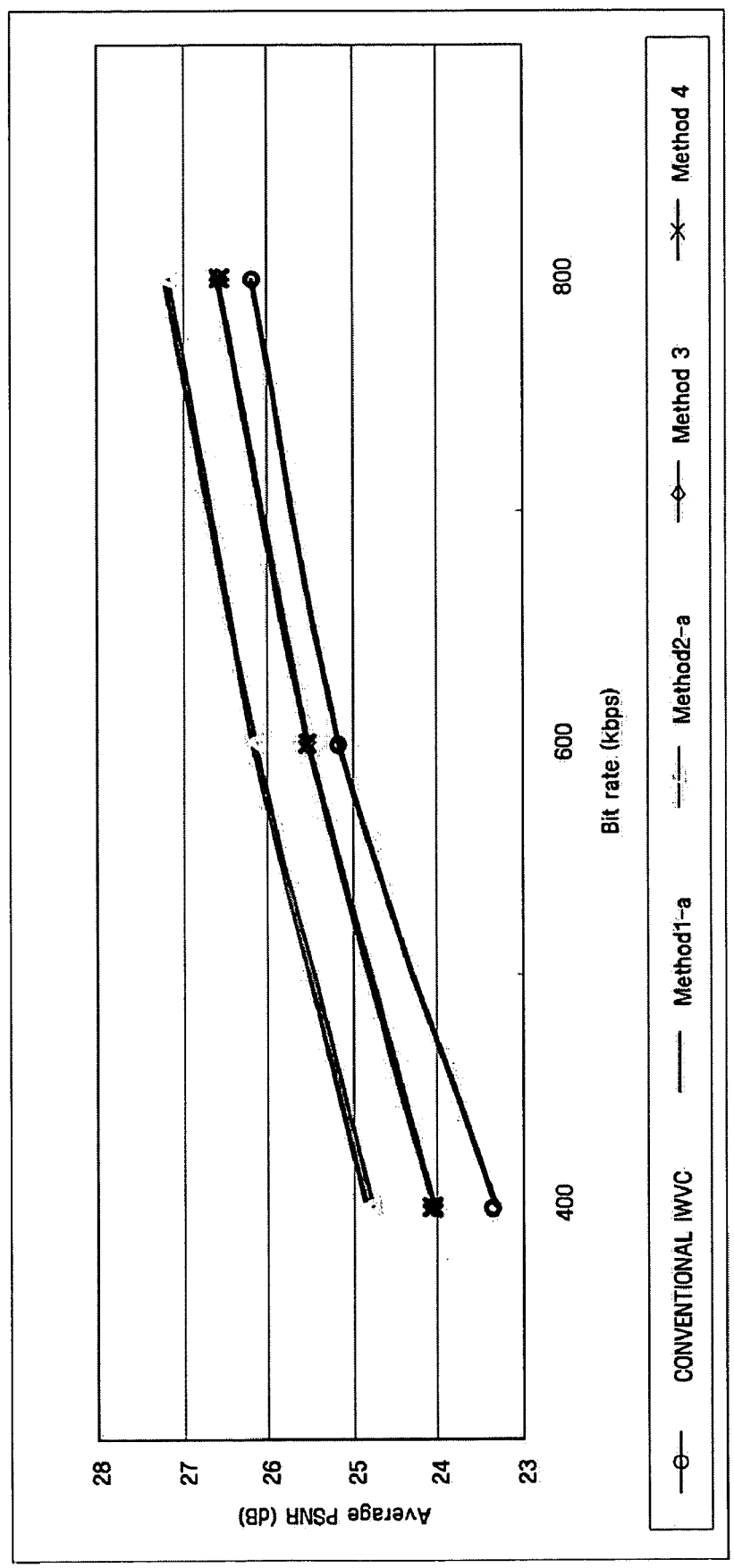
FIG. 7 is a graph comparing Peak Signal to Noise Ratios (PSNRs) with respect to a "Canoe" sequence between a conventional IWVC method and embodiments of the present invention.

FIG. 7 is a graph comparing peak signal to noise ratios (PSNRs) with respect to a "Canoe" sequence between the conventional IWVC and the embodiments of the present invention. Method1-a and Method2-a provide almost the same performance and give a higher PSNR than the conventional IWVC by 1.0 through 1.5 dB.

Figure 8:
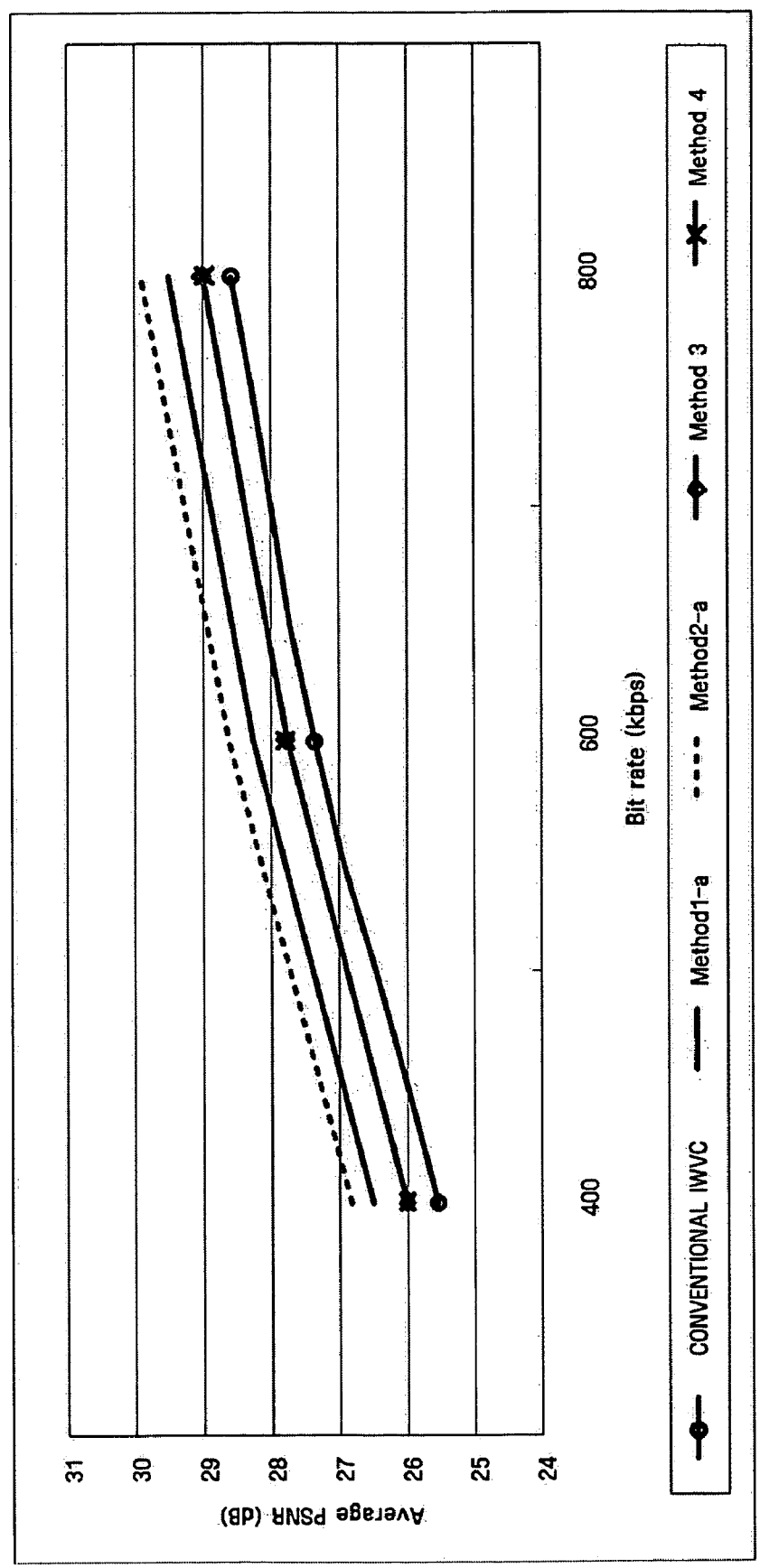
FIG. 8 is a graph comparing PSNRs with respect to a "Bus" sequence between a conventional IWVC method and embodiments of the present invention.

FIG. 8 is a graph comparing PSNRs with respect to a "Bus" sequence between the conventional IWVC and the embodiments of the present invention. Method1-a and Method2-a give higher PSNRs than the conventional IWVC by 1.0 dB and 1.5 dB, respectively. Method3 and Method4 provide lower performance than Method1-a and Method2-a but provide higher performance than the conventional IWVC.

Figure 9:
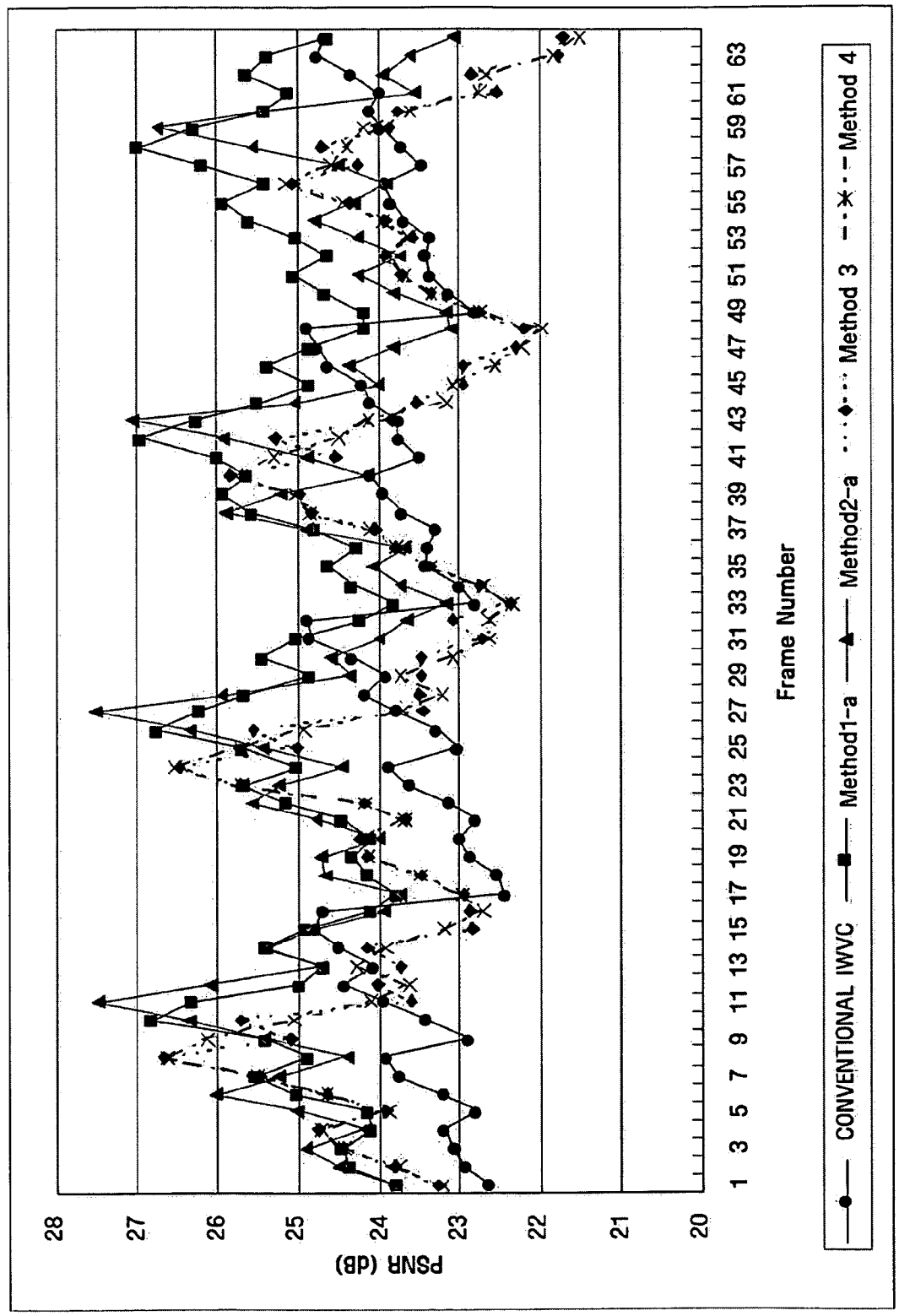
FIG. 9 is a graph comparing changes in PSNRs with respect to a "Canoe" sequence between a conventional IWVC method and embodiments of the present invention.

FIG. 9 is a graph comparing changes in PSNRs with respect to a "Canoe" sequence between the conventional IWVC and the embodiments of the present invention.

It can be inferred from FIG. 9 that a PSNR is highest at the position of the LLLL frame in a GOF in all of the methods.

Although only a few embodiments of the present invention have been shown and described with reference to the attached drawings, it will be understood by those skilled in the art that changes may be made to these elements without departing from the features and spirit of the invention. For example, in the above-described embodiments of the present invention, a single GOF includes 16 frames. However, the present invention is not restricted thereto. In addition, the embodiments of the present invention has been described and tested based on IWVC. However, the present invention can be applied to other coding techniques. Therefore, it is to be understood that the above-described embodiments have been provided only in a descriptive sense and will not be construed as placing any limitation on the scope of the invention.

According to the present invention, a total interframe temporal distance for motion estimation is reduced in a scalable video coding method using wavelets so that the performance of video coding can be improved.

What is claimed is:

1. An interframe wavelet video coding method comprising:
   receiving a group-of-frames and decomposing the group-of-frames into first difference frames and first average frames between the frames in a first forward temporal direction and a first backward temporal direction;
   wavelet-decomposing the first difference frames and the first average frames; and
   quantizing coefficients resulting from the wavelet-decomposition to generate a bitstream, wherein the decomposing the group-of-frames into the first difference and average frames comprises:
   (a) decomposing the group-of frames into a first difference frame and a first average frame between two frames in the first forward temporal direction; and
   (b) decomposing the group-of-frames into another first difference frame and another first average frame between other two frames in the first backward temporal direction, and
   wherein the decomposing the group-of-frames into the first difference and average frames further comprises decomposing the first average frames into a second difference frame and a second average frame between two first average frames in either of a second forward temporal direction and a second backward temporal directions.

2. The interframe wavelet video coding method of claim 1, further comprising obtaining a motion vector between frames and compensating for a temporal motion using the motion vector before decomposing the group-of-frames into the first difference and average frames.

3. The interframe wavelet video coding method of claim 1, wherein the first forward temporal direction and the first backward temporal direction are combined such that an average of temporal distances between frames in the group-of-frames is minimized.

4. The interframe wavelet video coding method of claim 1, wherein steps (a) and (b) are alternately performed with respect to the frames in the group-of-frames.

5. The interframe wavelet video coding method claim 1, wherein decomposing the first average frames into the second difference and average frames is repeated a plurality number of times.

6. The interframe wavelet video coding method of claim 5, wherein the second forward temporal direction and the second backward temporal direction are combined such that an average of temporal distances between frames in the group-of-frames is minimized.

7. The interframe wavelet video coding method of claim 1, wherein decomposing the first average frames into the second difference and average frames comprises:
   (c) decomposing the first average frames into a second difference frame and a second average frame between two first average frames in the second forward temporal direction; and
   (d) decomposing the first average frames into another second difference frame and another second average frame between other two first average frames in the second backward temporal direction.

8. The interframe wavelet video coding method of claim 7, wherein steps (c) and (d) are alternately performed with respect to the first average frames.

9. The interframe wavelet video coding method of claim 7, wherein steps (a) and (b) are performed alternately and sequentially with respect to the frames in the group-of-frames.

10. The interframe wavelet video coding method of claim 9, wherein step (a) is preformed with respect to temporally first half of all of the frames in the group of frames and step (b) is performed with respect to temporally second half of all of the frames in the group-of-frames.

11. The interframe wavelet video coding method of claim 1, wherein steps (a) and (b) are performed alternately and sequentially with respect to the frames in the group-of-frames.

12. The interframe wavelet video coding method of claim 1, wherein step (a) is preformed with respect to temporally first half of all of the frames in the group of frames and step (b) is performed with respect to temporally second half of all of the frames in the group-of-frames.

13. The interframe wavelet video coding method of claim 1, wherein decomposing the first average frames into the second difference and average frames is repeated at least one time.

* * * * *